Aug. 5, 1969  H. E. KAMPS  3,459,049

SPRAY PATTERN MEASUREMENT

Filed Dec. 19, 1967

INVENTOR.
HENRY E. KAMPS
BY
ATTORNEYS.

Aug. 5, 1969   H. E. KAMPS   3,459,049
SPRAY PATTERN MEASUREMENT
Filed Dec. 19, 1967   3 Sheets-Sheet 2
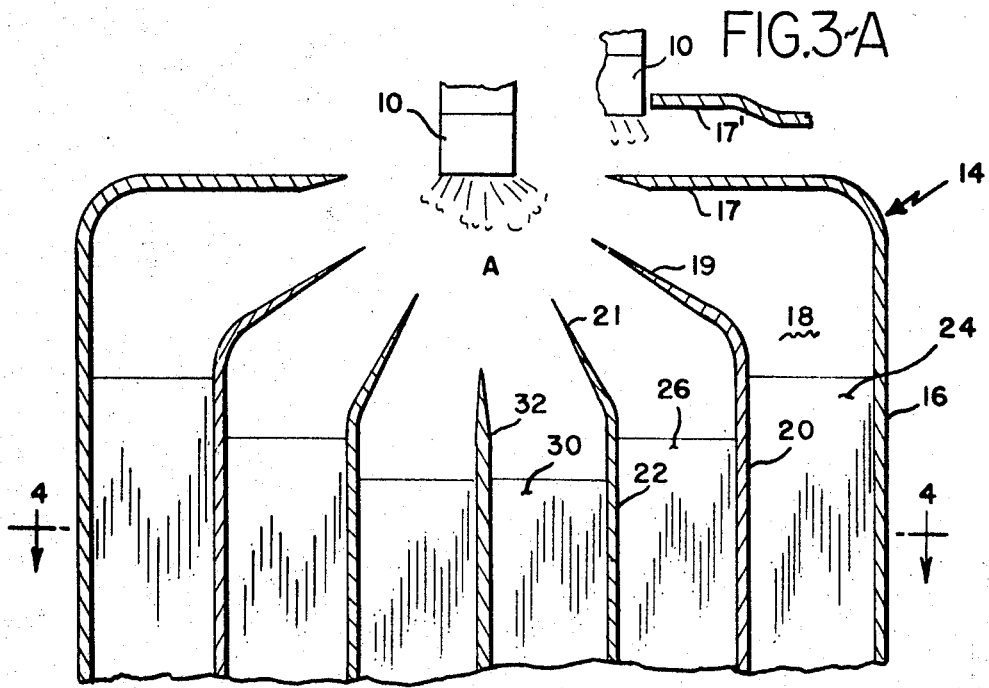
FIG. 3A
FIG. 3
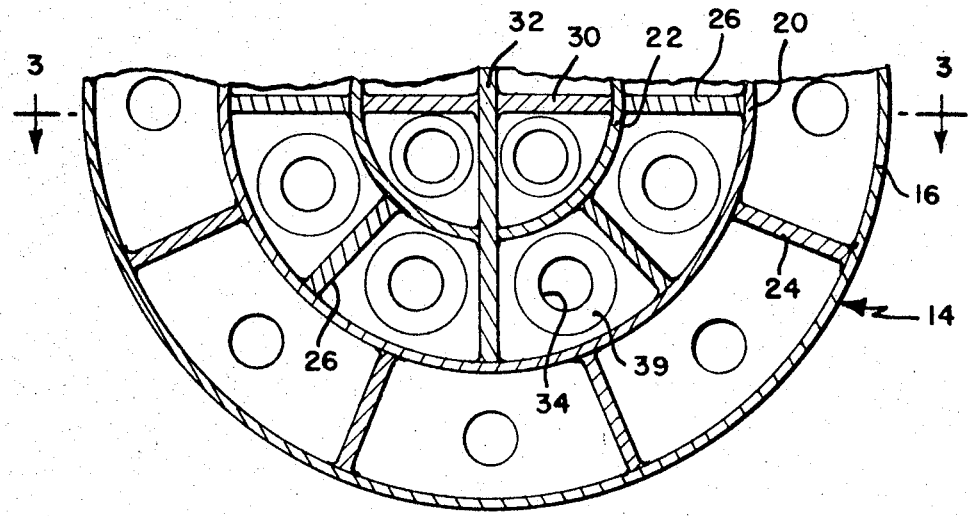
FIG. 4
INVENTOR.
HENRY E. KAMPS
BY Harry A. Herbert Jr.
Ruth Coslier
ATTORNEYS 3,459,049
Patented Aug. 5, 1969

3,459,049
SPRAY PATTERN MEASUREMENT
Henry E. Kamps, Sharonville, Ohio, assignor to the United States of America as represented by the Secretary of the Air Force
Filed Dec. 19, 1967, Ser. No. 691,888
Int. Cl. G01n 33/00
U.S. Cl. 73—432                                    5 Claims

ABSTRACT OF THE DISCLOSURE

A pattern separator in the form of flow dividing partitions is placed in planned spaced proximity to a nozzle or spray head and the fluid emerging from the nozzle is collected, identified with the orifices in the several nozzle areas, and lead off to a series of individual measuring devices identified also with the several spray head areas. Accommodation is made in the design of the pattern separator for the angle of spray emergence.

BACKGROUND OF THE INVENTION

In the past quantitative inspection of combustion spray nozzle patterns for fuel nozzles and nozzles for other uses has been extremely difficult to obtain. These inspection devices for fuel spray patterns are expensive and operator interpretation of these devices lead to errors. There are also methods of measuring fuel spray quantity in the arc of the circle, but these methods employ the simple spraying of fuel into a compartmented catch basin.

SUMMARY OF THE INVENTION

The invention seeks to overcome these difficulties. A test rig and the method for spray pattern measurement has been devised for collecting, compartmentalizing fluid from a spray head or nozzle and identifying the collected fluid, with the area of the nozzle from which it emerged, and measuring the fluid thus collected. Defective orifices and uneven spray patterns are thus detected.

In the device and method of the invention, accommodation is made for the angle of emergence of the spray from the spray head. This is accomplished by making the distance of the nozzle from the pattern head adjustable. The angle is further accommodated by the configuration of the upper portion of the pattern head, determining the shape of a free space, and designed to collect all of the emerging spray. In operation, the fuel or measuring fluid is passed through the spray head for a specified time, the spray emerging finds its proper compartment in the pattern head, passes through it and is conducted to "weigh" bottles, or other measuring devices. The performance of each nozzle area and the orifice or orifices in it can thus be examined.

DESCRIPTION OF THE DRAWINGS

In the drawing.

FIGURE 3 is a fragmentary vertical cross sectional view of the upper portion of the pattern head element showing its relationship to the nozzle. This figure is closely related to FIGURE 4 and is taken substantially on the line 3—3 of FIGURE 4 looking in the direction of the arrows;

FIGURE 3A is an alternative form showing a modified configuration of the top portion of the pattern head unit;

FIGURE 4 is a horizontal cross sectional view analogous to FIGURE 2 showing the radial arrangement of the separating channels, and taken on the line 4—4 of FIGURE 3 and looking in the direction of the arrows;

DESCRIPTION OF THE PREFERRED EMBODIMENT

Figure 1:
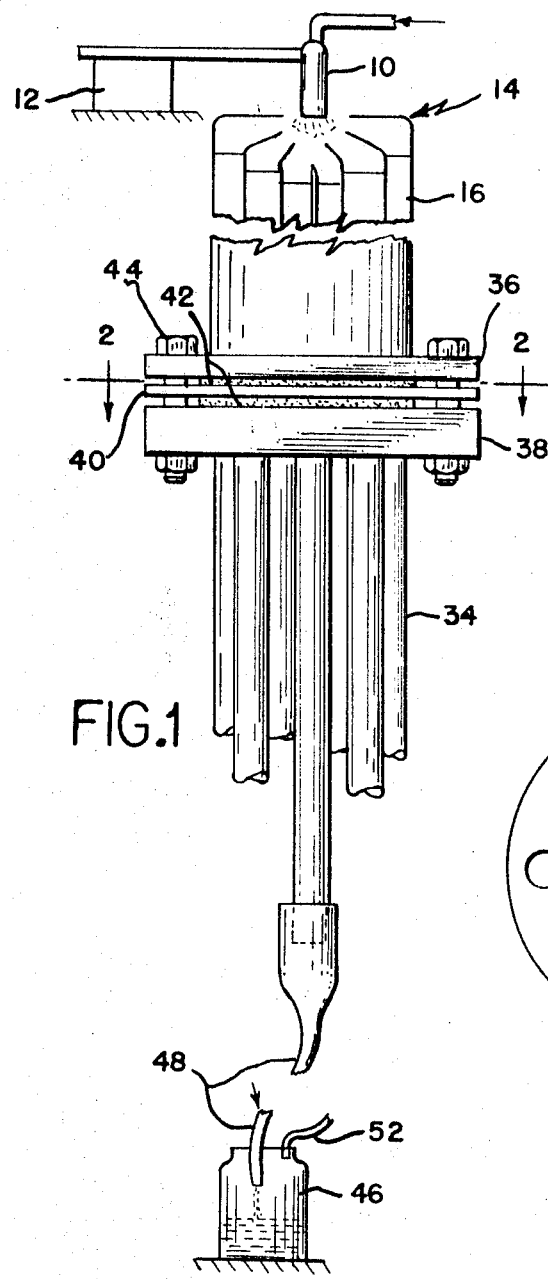
FIGURE 1 is a fragmentary schematic front elevational view of the device.
Figure 2:
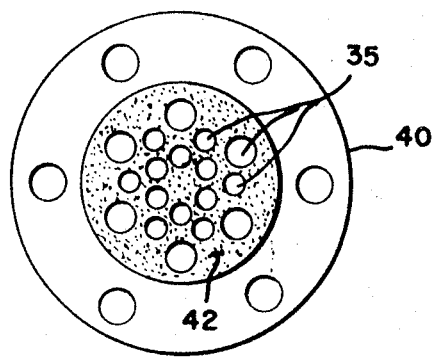
FIGURE 2 is a horizontal cross section through the sealing gasket, taken on the line 2—2 of FIGURE 1, and looking in the direction of the arrows.

Referring more in detail to the drawing, wherein like numerals refer to the same elements in all of the figures:

A nozzle or spray head 10 receives fluid from a source not shown and is adjustable vertically in any desired degree by a spacer 12, which is any form of adjustable spacing means capable of adjusting the distance between the spray head 10 and a spray pattern head 14.

As expedience dictates the spray head 10 may be movable to adjust the distance between pattern head, or the pattern head itself may be adjustable, or both. This is a mechanical expedient and is adjunctive to the invention.

The pattern head 14, as shown, is cylindrical in cross section but may be of any other configuration found desirable. As shown the area 16 therein is divided by partitions to form vertically extended open ended channels.

The arrangement of partitions which form the vertical channels, that is, the arrangement of the channels themselves is a matter of choice and mechanical construction. As shown in FIGURES 3 and 4, the pattern head element 14 comprises an outer cylindrical wall 16, the space 18 contained therein being divided radially by two concentric cylindrical partition elements 20 and 22 into two concentric toroids and an inner cylinder. The cylindrical partition element 20 is secured to the outer cylinder 16 by a series of radial dividing and supporting elements 24. In the same manner, the cylindrical wall 20 is connected to the inner wall 22 by the radial supporting and dividing elements 26. And finally, the elements 30 and 32, normally disposed with respect to each other form the divisional walls for the inner circle.

The cubical area within the pattern head is thus divided into twenty-two open ended compartments. This pattern of area segmentation is described only as an example of a working embodiment of the invention and lends itself to other configurations and designs. Of importance to any design is the location and manner of termination of the upper ends of the walls. As will be seen from FIGURE 3, the upper ends of the outer container 14 and those of the dividing partitions 20 and 22 have portions 17, 19 and 21 directed inwardly toward the nozzle 10 and are sharpened to avoid spattering. It will also be noted that the wall or partition elements terminate at points to form a cup shaped free area A, so that the spray angle is accommodated. As before noted, the position of the spray head is adjustable by means of the spacing device 12. A near perfect collection and segmentation of the spray from the spray head is thus effected.

As shown in FIGURES 1 and 4, each vertical channel in the pattern head communicates with a lead pipe 34, leading eventually to a measuring device. To make this connection, the lower portion of the pattern head 14 is secured to, or made integral with, a plate or orificed flange 36. The lower portions of the partitions may be frusto conical or otherwise narrowed (see 39, FIGURE 4).

The pipes or tubes 34 are set into openings in a head member 38. These openings mate with the openings 35 in the flange 36 to provide uninterrupted communication. Suitable seals are provided such as gasket 40 and packing 42, the whole joint being secured in any suitable manner, such as the bolts 44.

Each compartment and pipe lead to some kind of weighing or measuring device. A bottle 46 is shown in FIGURE 1.

Figure 5:
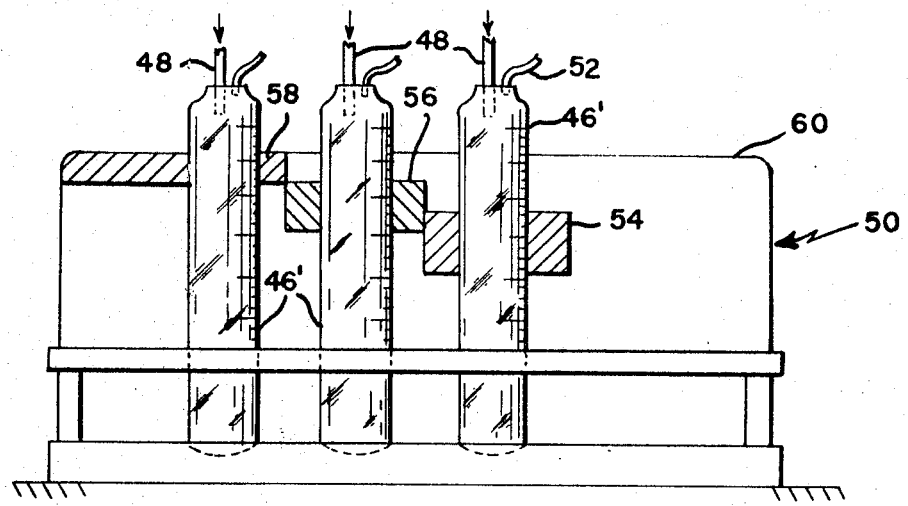
FIGURE 5 is a front elevational view partly in cross section of a measuring bottle rack.

Each bottle 46 is provided with an inlet conduit 48 which may be flexible to allow arrangement in racks such as the rack 50 shown in FIGURE 5 and each is provided with a vent 52. These are expedient arrangements and subject to such modification as expedience dictates. One such design modification is shown in FIGURE 3A, wherein the terminating portion 17 of the outer container 16 is recessed upwardly and drawn in closely to the nozzle 10.

The rack 50 may be provided with tier racks 54, 56 and 58 accommodating measuring tubes or bottles 46' and a board 60 for sight inspection of liquid levels in the bottles.

Figure 6:
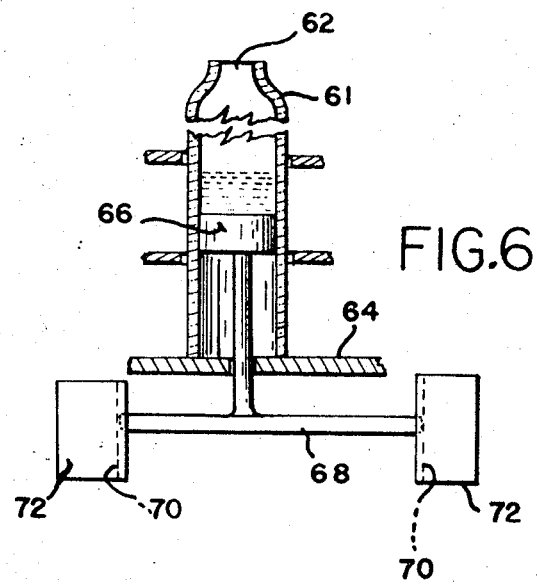
FIGURE 6 is a cross sectional view of a modified form of a measuring bottle showing an adjustable stopper.

FIGURE 6 shows a modified measuring container and its mounting. A bottle 61 provided with upper inlet 62 is mounted immovably on a support 64. A movable piston stopper 66 is attached to a beam member 68, the ends of which are mounted to slide in grooves 70, in supporting members 72. The location of the stopper 66 is thus adjustable to chosen positions to make the capacity of the bottle 61 variable.

It will be noted that each bottle, 46, 46' or 60, or each measuring device is identifiable with a nozzle area. Twenty divisions or compartments are shown. If the nozzle has twenty orifices, each measuring device would then represent the performance of a single nozzle orifice.

Although the invention has been describe with reference of particular embodiments, it will be understood to those skilled in the art that the invention is capable of a variety of alternative embodiments.

I claim:

1. A device for testing uniformity of flow from the plurality of orifices on the surface of a nozzle emitting fluid, said device comprising a pattern head adjustably positioned a predetermined distance below said nozzle, said pattern head comprising a plurality of open ended compartments for collecting and separating the fluid emerging from said nozzle including an outer cylindrical element, a plurality of cylindrical elements of successively smaller radial dimension located within said outer cylindrical element and concentrially therewith, thus forming a cylindrical space at the center of said outer cylindrical element and toroidal spaces concentric with the central space, a plurality of vertically arranged partitions functioning as supporting and dividing elements, said elements dividing said central space and said toroidal spaces into open ended compartments, each compartment identifiable with an area of said nozzle and collecting at the upper end of said compartment the fluid emerging from said area, the lower end of each compartment communicating with a measuring device and means for delivering its collected contents to said measuring device, each measuring device identifiable with an area of said nozzle.

2. A device as claimed in claim 1 wherein said measuring device comprises a bottle communicating with and receiving fluid from one of said compartments, a stopper mounted on the lower portion of said bottle and closing off the lower end thereof, said stopper being movable longitudinally along said tube to render the volume of said bottle variable.

3. A device as claimed in claim 2 wherein each cylindrical element is provided with an inwardly directed upper portion so formed as to collect in its entirety the amount of fluid emerging from said nozzle and compartmentalizing said fluid accurately with respect to said nozzle areas.

4. A device according to claim 3 wherein the upper portions of said inner cylindrical elements and said partition members are sharpened to avoid spattering of said fluid and render an exact compartmentalization.

5. A device according to claim 2 wherein the said outer cylinder and said inner cylinders terminate to provide a cup-like free space about the emitting area of said nozzle so that all the fluid emerging therefrom is accurately collected and compartmentalized.

References Cited

UNITED STATES PATENTS

| 2,483,637 | 10/1949 | Hawthorne et al. | 73—119 XR |
| 3,033,026 | 5/1962 | Krulish | 73—119 XR |

LOUIS R. PRINCE, Primary Examiner

H. C. POST III, Assistant Examiner

U.S. Cl. X.R.

73—119, 168; 211—74